(12) United States Patent
Cheng

(10) Patent No.: US 9,234,623 B2
(45) Date of Patent: Jan. 12, 2016

(54) WALL HANGING MECHANISM

(71) Applicant: HON HAI PRECISION INDUSTRY CO., LTD., New Taipei (TV)

(72) Inventor: Ren-Tsung Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 48 days.

(21) Appl. No.: 14/158,788

(22) Filed: Jan. 18, 2014

(65) Prior Publication Data

US 2014/0217251 A1 Aug. 7, 2014

(30) Foreign Application Priority Data

Feb. 5, 2013 (TW) ............................. 102104334 A

(51) Int. Cl.
*F16M 13/02* (2006.01)
*F16B 47/00* (2006.01)

(52) U.S. Cl.
CPC ................ *F16M 13/02* (2013.01); *F16B 47/00* (2013.01)

(58) Field of Classification Search
CPC ... G06F 1/1607; G06F 1/1609; G06F 1/1611; G06F 1/1632; G06F 1/1633; G06F 1/1656; G06F 1/1658; G06F 1/166; Y10T 24/33; Y10T 403/7015; A47G 1/16; A47G 1/17; A47G 1/1653; F16B 47/00; F16M 13/02
USPC ............. 248/205.4, 205.6, 205.3, 205.1, 467, 248/475.1, 489, 685, 683; 361/679.23, 361/679.33–679.39; 40/746
See application file for complete search history.

(56) References Cited

U.S. PATENT DOCUMENTS

| | | | |
|---|---|---|---|
| 4,863,130 A * | 9/1989 | Marks, Jr. .................... | 248/206.3 |
| D329,192 S * | 9/1992 | Susac .............................. | D8/349 |
| 5,173,936 A * | 12/1992 | Ditzig et al. ................... | 379/440 |
| 2003/0193005 A1 * | 10/2003 | Hui ................................ | 248/489 |
| 2011/0139732 A1 * | 6/2011 | Cabanban ..................... | 211/13.1 |
| 2011/0216251 A1 | 9/2011 | Perez et al. | |
| 2011/0290965 A1 * | 12/2011 | Virgin ......................... | 248/205.3 |
| 2013/0048809 A1 * | 2/2013 | Jacobson .................... | 248/206.2 |
| 2013/0232923 A1 * | 9/2013 | Beversluis ....................... | 53/492 |
| 2014/0048658 A1 * | 2/2014 | Chen et al. ....................... | 248/56 |
| 2014/0061406 A1 * | 3/2014 | Chevalier et al. ........... | 248/205.1 |
| 2014/0202523 A1 * | 7/2014 | Guo .............................. | 136/251 |
| 2014/0319296 A1 * | 10/2014 | Clouser ...................... | 248/206.3 |
| 2015/0070839 A1 * | 3/2015 | Johnson .................... | 361/679.56 |

FOREIGN PATENT DOCUMENTS

| | | |
|---|---|---|
| CN | 202171106 U | 3/2012 |
| TW | M247723 U | 10/2004 |
| TW | M287890 U | 2/2006 |

* cited by examiner

*Primary Examiner* — Ingrid M Weinhold
(74) *Attorney, Agent, or Firm* — Novak Druce Connolly Bove + Quigg LLP

(57) ABSTRACT

A wall hanging mechanism is set on a shell of an electronic product for hanging it on the wall. The wall hanging mechanism includes a top cover, a bottom cover and a hanging plate. The edge of the top cover is provided with an opening. The bottom cover is mounted on the top cover to form a receiving space. The hanging plate is placed in the receiving space, and includes an area for adhesion, an area for mounting screw and an area for mounting sucker. The opening exposes at least one of the areas. The wall hanging mechanism can provide a variety of hanging options, and user can choose hanging plates configured in different positions according to the weight of the electronic product. The wall hanging mechanism may satisfy different requirement of user.

11 Claims, 5 Drawing Sheets

WALL HANGING MECHANISM

BACKGROUND

1. Technical Field

The disclosure relates to a wall hanging mechanism, and more particularly to a wall hanging mechanism configured with several mounting options.

2. Description of Related Art

In order to save space, electronic products, such as a modem, needs to be hung on the walls. The conventional wall hanging mechanism configured for hanging or mounting electronic products includes a hanging member, such as a screw, an adhesive, or a suction cup. In general, different wall hanging mechanisms are suitable for different types of walls. For example, the suction cups are suitable for glass walls. In addition, users may have different requirements for the wall hanging mechanism. The screw, as a hanging member, may not be suitable for avoiding damage the appearance of the walls. However, the conventional wall hanging mechanism only include one type of hanging member, and users need to buy different wall hanging mechanisms to satisfy different wall mounting requirements.

Therefore, a wall hanging mechanism configured with different hanging members is needed.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

A wall hanging mechanism of present disclosure is mounted on a shell of an electronic product, configured for hanging the electronic product on a wall. The electronic product can be, but not limited to, a worldwide interoperability for microwave access (Wimax) or a modem.

Figure 1:
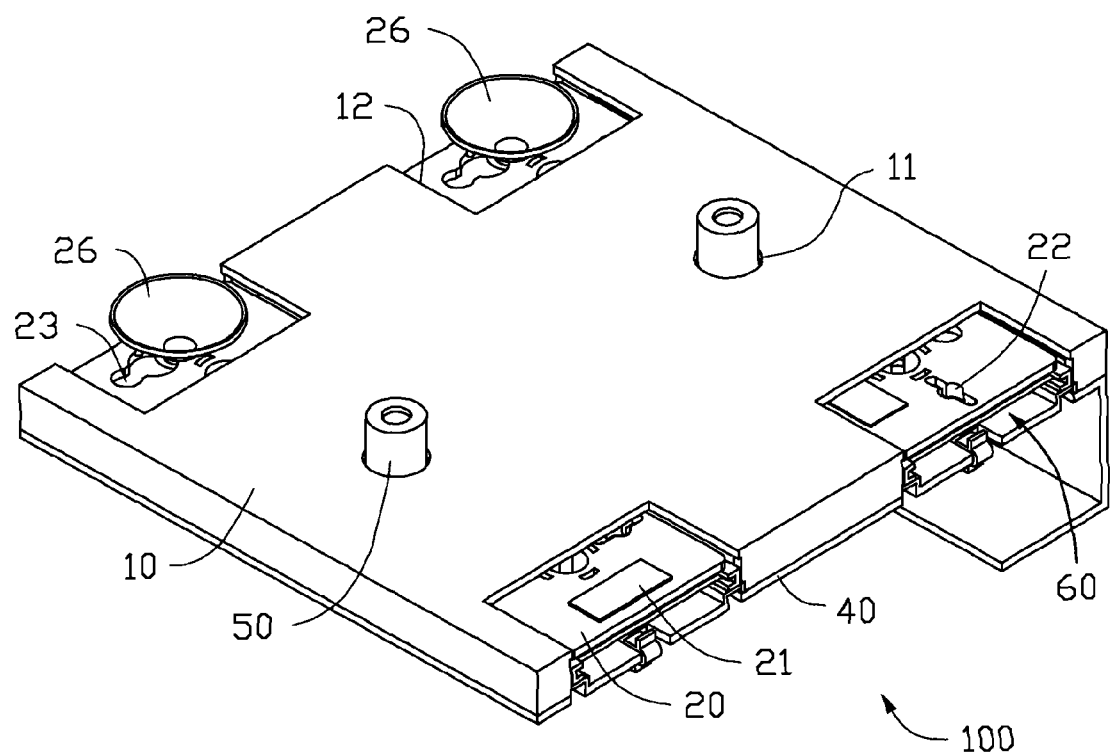
FIG. 1 is a perspective view of a wall hanging mechanism of an embodiment of present disclosure.

FIG. 1 shows a wall hanging mechanism 100 of a preferred embodiment of present disclosure. The wall hanging mechanism 100 includes a top cover 10, at least one hanging plate 20, a bottom cover 40, and at least one button 50.

The top cover 10 is substantially rectangular, and defines two mounting holes 11 and four openings 12. The mounting holes 11 are spaced from each other aligned on a symmetrical axis of the top cover 10. The four openings 12 are substantially rectangular, and defined on the periphery of two opposite sides of the top cover 10. In this embodiment, the openings 12 are symmetrically positioned on two sides of the mounting hole 11. The opening 12 is configured for exposing at least a part of the hanging plate 20. The bottom cover 40 is mounted on the top cover 10 to form a receiving space 60.

The bottom cover 40 is substantially rectangular with a L-shape portion on periphery thereof, which is configured for connecting to the electronic product (not shown). In this embodiment, there are two buttons 50 and four hanging plates 20 in the wall hanging mechanism 100. The hanging plate 20 includes different hanging members configured for hanging the electronic products by different ways or options. The button 50 passes through the mounting hole 11 of the top cover 10 to be elastically mounted on the bottom cover 40.

Figure 2:
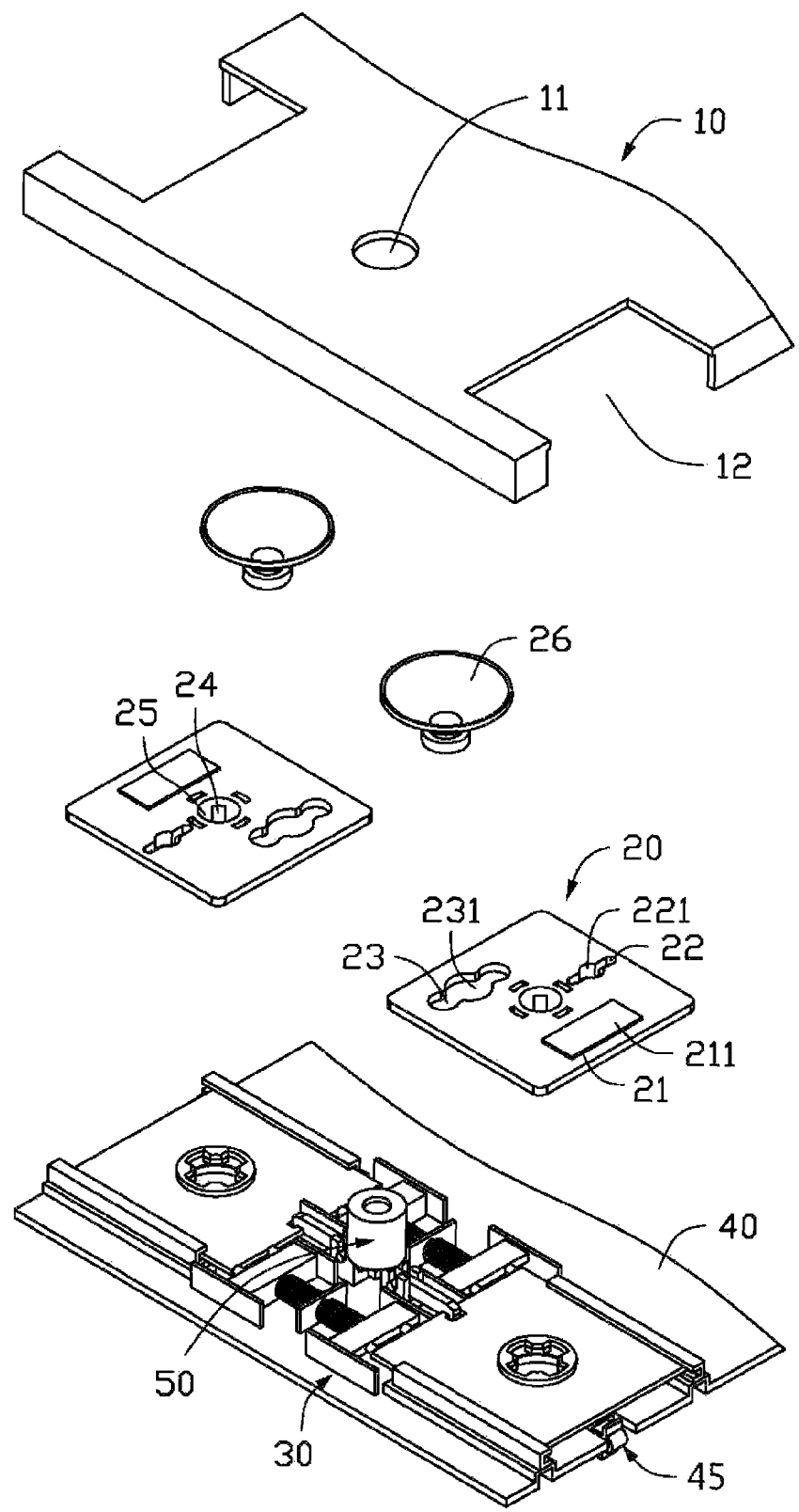
FIG. 2 is a partial exploded, isometric view of the wall hanging mechanism as shown in FIG. 1.

FIG. 2 shows a part of the wall hanging mechanism 100. The hanging plate 20 is substantially rectangular, and includes three hanging members. The hanging plate 20 includes three adjacent areas, which are as follow: a first area 21 for adhesion, a second area 22 for mounting or attaching a screw, and a third area 23 for mounting a sucker. The first area 21 includes an adhesive tape 211, the second area 22 includes a screw hole 221 configured for mounting a screw (not shown), and the third area 23 includes a sucker hole 231 configured for mounting a suction cup 26. The hanging plate 20 defines a rotary hole 24 in the central portion thereof, and a number of latching members 25 positioned around the rotary hole 24, thereby allowing the hanging plate 20 to be rotatable with other components. In the preferred embodiment, there are four latching members 25 which are evenly spaced apart from each other.

Figure 3:
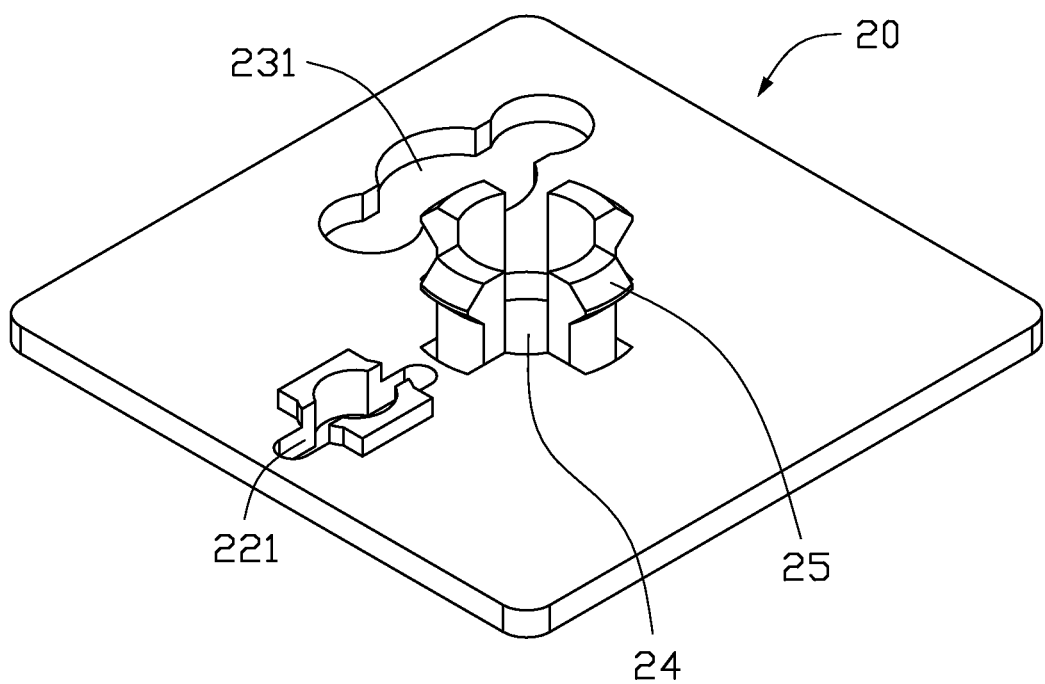
FIG. 3 is a perspective view of a hanging plate in the wall hanging mechanism as shown in FIG. 1.

Refer to FIG. 2 and FIG. 3. The screw hole 221 and the sucker hole 231 are through holes formed in the hanging plate 20. The four latching members 25 are protruding from the periphery of the hanging plate 20, and extending toward the bottom cover 40.

Figure 4:
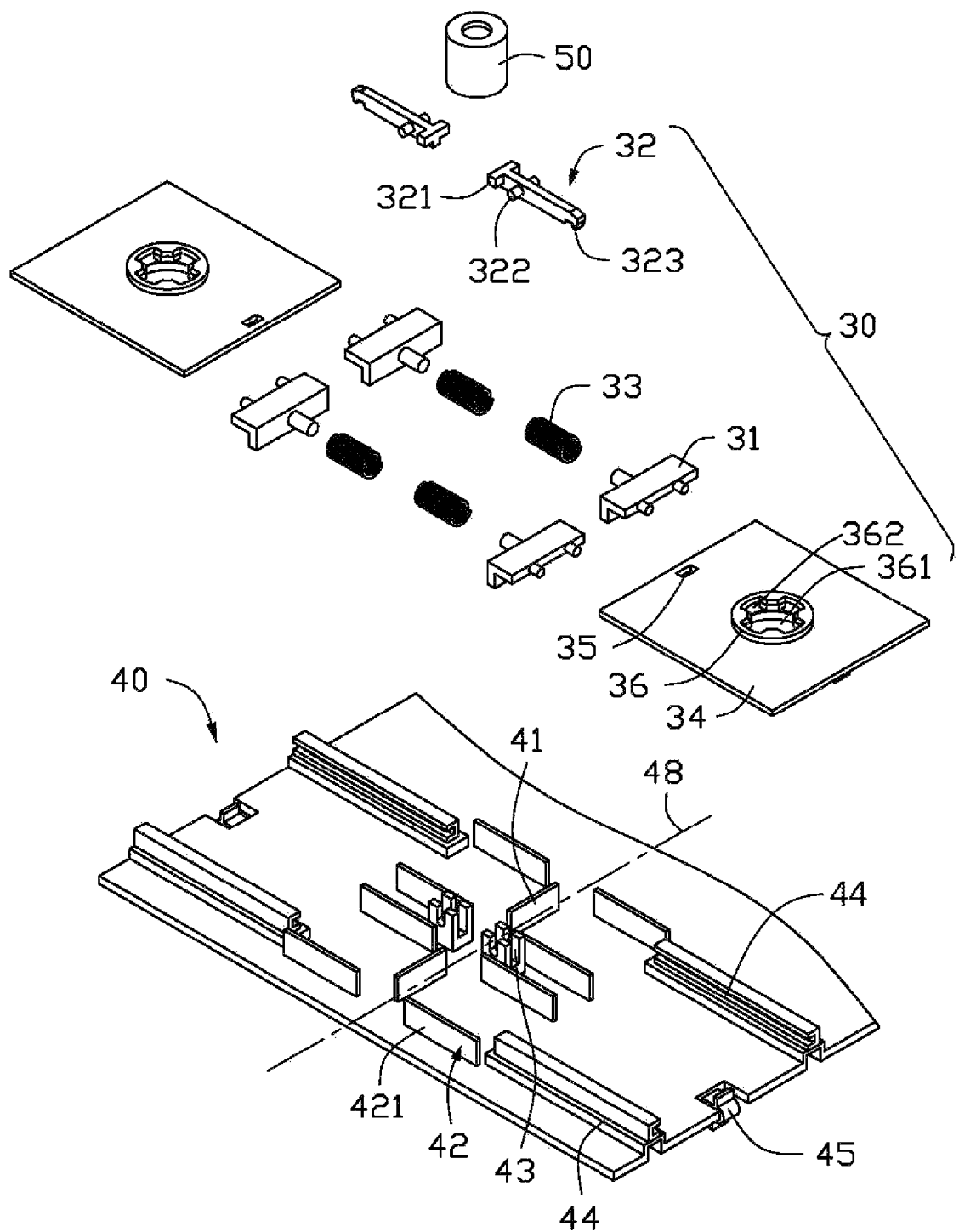
FIG. 4 is a partial exploded, isometric view of the wall hanging mechanism as shown in FIG. 1.

The wall hanging mechanism 100 further includes four pushing assemblies 30 configured for pushing the hanging plate 20 conveniently. The pushing assemblies 30 are mounted on the bottom cover 40. FIG. 4 shows the pushing assemblies 30 and the bottom cover 40. There are two pushing assemblies 30 shown in FIG. 4. Each pushing assembly 30 includes two pushing plates 31, a connecting rod 32, two elastic members 33, and a sliding plate 34.

The bottom cover 40 includes two pairs of blocking plates 41, four sliding rails 44, eight guiding members 42, and four clasps 45. FIG. 4 shows a half of the bottom cover 40, thus including a pair of blocking plates 41, four guiding members 42, two pairs of sliding rails 44, and two clasps 45. The two blocking plates 41 are formed spaced from each other on a symmetrical axis 48 of the bottom cover 40, and extend along the symmetrical axis 48. Two guiding members 42 are positioned on the two sides of each blocking plate 41, and extend vertically to the symmetrical axis 48. Each guiding member 42 includes two guiding plates 421 positioned opposite to each other. The guiding plate 421 is substantially rectangular, and extends vertically to the symmetrical axis 48. The bottom cover 40 further includes a number of slots 43 positioned near one end of the guiding members 42, and between two guiding members 42. The slot 43 defines a groove in the center thereof. The sliding rails 44 are positioned near the other end of the guiding members 42, and extend to the edge of the bottom cover 40 along a direction vertical to the symmetrical axis 48. The two guiding plates 421 positioned at the outermost of two adjacent guiding members 42 are adjacent to the sliding rails 44. Each clasp 45 is positioned between the sliding rails 44, and on the edge of the bottom cover 40. The clasps 45 are shaped like gooseneck.

The sliding plate 34 is substantially rectangular, and capable of sliding on the sliding rails 44. The sliding plate 34 includes a latching hole 35 and a rotary portion 36. The rotary portion 36 includes a through hole 361, and a number of latching slots 362 positioned on the periphery of the through hole 361. In the illustrated embodiment, the rotary portion 36 includes four latching slots 362. The latching members 25 on the hanging plate 20 are latched to the latching slots 362, thereby connecting the hanging plate 20 to the sliding plate 34.

One end of the pushing plate 31 is fixed on one end of the sliding plate 34 near the latching hole 35, and the other end of the pushing plate 31 is attached to the elastic member 33, thereby enabling the sliding plate 34 to be capable of sliding on the sliding rail 34 by the elastic force of the elastic member 33.

The connecting rod 32 is disposed adjacent to the button 50, including a pressing portion 321, a protrusion portion 322, and a latching portion 323. The pressing portion 321 and the latching portion 323 are formed at two ends of the connecting rod 32. The protrusion portion 322 is protruded from two opposite ends of the center of the connecting rod 32, and located between the pressing portion 321 and the latching portion 323. In assemble, the protrusion portion 322 is rotatably received in the slot 43, thereby the connecting rod 32 is capable of rotating around the protrusion portion 322 relative to the bottom cover 40.

In this embodiment, the latching portion 323 is accommodated to the latching hole 35. When the pressing portion 321 is pressed, the connecting rod 32 rotates around the protrusion portion 322, and the latching portion 323 is lifted to withdraw from the latching hole 35 or is latched to the latching hole 35 again.

The hanging plate 20 is capable of sliding on the sliding rails 44 driven by the pushing assembly 30, in order to be sliding out of the receiving space 60 between the top cover 10 and the bottom cover 40, and it is convenient for the user to use the hanging plate 20. In addition, as the latching members 25 are engaged with the latching slots 362, the hanging plate 20 is fixed to the sliding plate 34. Under an external force, the hanging plate 20 is rotated, and the latching members 25 are withdrawn away from the latching slots 362. User can choose or select one area from the first area 21 for adhesion, the second area 22 for mounting screw, and the third area 23 for mounting sucker of the hanging plate 20 to hang the electronic product. The area chosen by the user will be exposed by the opening 12 of the top cover 10. After one area of the hanging plate 20 is chosen as the selected mounting option, the latching members 25 are latched to the latching slots 362 again, thereby fixing the hanging plate 20 to the sliding plate 34 again.

Figure 5:
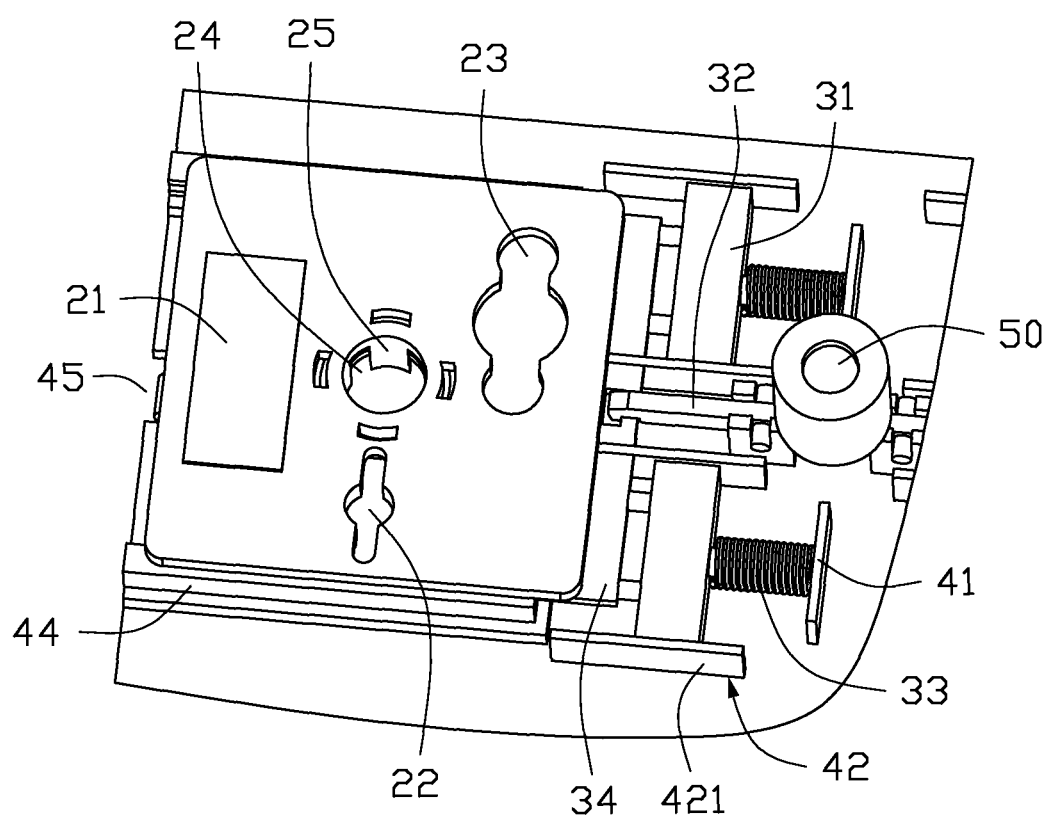
FIG. 5 is a partial assembled view of the wall hanging mechanism as shown in FIG. 1.

FIG. 5 shows a part of the wall hanging mechanism 100. Please refer to FIG. 2 through FIG. 5. The hanging plate 20 is fixed on the sliding plate 34, and the sliding plate 34 is mounted on the sliding rail 44, with one end thereof connected with the pushing assemblies 30.

In the above preferred embodiment, a hanging module includes a button 50, a pair of pushing assemblies 30, and a pair of hanging plates 20, and the wall hanging mechanism 100 in the preferred embodiment includes two hanging modules. In other embodiments, a wall hanging mechanism may include one or more hanging modules.

In use, when a user presses the button 50, the connecting rod 32 is lifted, and the latching portion 323 of the connecting rod 32 is withdrawn from the latching hole 35 on the sliding plate 34. At the same time, the elastic member 33 of the pushing assembly 30 generates a push force to the sliding plate 34, thereby the sliding plate 34 with the hanging plate 20 is moved toward the edge of the bottom cover 40 through the sliding rail 44 until the hanging plate 20 is moved to the outside of the receiving space 60 of the wall hanging mechanism 100. Because one button 50 is connected with two connecting rods 32, thus when the button 50 is pressed, the two hanging plates 20 connected with the two connecting rods 32 are moved at the same time.

After the hanging plate 20 moved to the outside of the receiving space 60 of the wall hanging mechanism 100, the user can lift and rotate the hanging plate 20 to choose one area used to hang the electronic product. The hanging plate 20 and the sliding plate 34 are pushed to the receiving space 60, and the clasp 45 resists against the sliding plate 34 to enhance structural integrity of the wall hanging mechanism 100. At least one area of the hanging plate 20 is exposed by the opening 12 of the top cover 10. As shown in FIG. 1, the first area 21, the second area 22, and the third area 23 are exposed.

The hanging plate 20 includes three areas configured with different hanging options, so that users can choose at least one hanging method or option that is adapted to the type of wall utilized. Moreover, uses can choose one or more hanging modules depend on the weight of the electronic product. In use, the hanging plate 20 can move outside of the wall hanging mechanism 100 when the button 50 is pressed, so it is convenient to use the wall hanging mechanism 100. The wall hanging mechanism 100 may satisfy different usage requirement of the user.

In other embodiment, the wall hanging mechanism 100 may include one hanging plate 20, and the top cover 10 defines one opening 12 corresponding to the hanging plate 20. The bottom cover 40 includes one pushing assembly 30.

It is to be understood that even though numerous characteristics and advantages of the present embodiments have been set forth in the foregoing description, with details of the structures and functions of the embodiments, the disclosure is illustrative only; and that changes may be in detail, especially in matters of shape, size, and arrangement of parts, within the principles of the embodiments, to the full extent indicated by the broad general meaning of the terms in which the appended claims are expressed.

What is claimed is:

1. A wall hanging mechanism, used to hang an electronic product on a wall, comprising:
   a top cover, the top cover defines at least one opening at a periphery thereof;
   a bottom cover connected to the top cover to form a receiving space with the top cover;
   at least one hanging plate mounted in the receiving space, wherein the hanging plate comprises a first area with an adhesive tape for adhesion, a second area with a screw hole for mounting a screw, and a third area with a sucker mounted in a sucker hole; one of the first, second, and third areas is exposed by the opening; and
   a sliding plate mounted in the receiving space, the hanging plate attached to the sliding plate wherein the hanging plate is rotatable on the sliding plate to allow selection of either the first area, the second area, or the third area to mount on the wall.

2. The wall hanging mechanism of claim 1, wherein the bottom cover comprises L-shaped portion configured for connecting with the electronic product.

3. The wall hanging mechanism of claim 1, wherein the sliding plate comprises a rotary portion with a through hole and a plurality of latching slots positioned on a periphery of the through hole.

4. The wall hanging mechanism of claim 3, wherein the hanging plate further comprises a plurality of latching members, and the latching members are latched to the latching slots of the sliding plate so as to mount the hanging plate to the sliding plate.

5. The wall hanging mechanism of claim 4, wherein the wall hanging mechanism further comprises at least one sliding rail positioned on the bottom cover, and the sliding rail extends to an edge of the bottom cover; the sliding plate is mounted on the sliding rail.

6. The wall hanging mechanism of claim 5, wherein the wall hanging mechanism further comprises at least one pushing assembly; the at least one pushing assembly comprises a pushing plate, and an elastic member; one end of the pushing plate is fixed on the sliding plate, and a second end of the pushing plate is attached to the elastic member.

7. The wall hanging mechanism of claim 6, wherein the pushing assembly further comprises a connecting rod, and the connecting rod comprises a pressing portion, a protrusion portion, and a latching portion; the pressing portion and the latching portion are formed at two ends of the connecting rod, and the protrusion portion is protruded from a center of the connecting rod; the sliding plate further comprises a latching hole engaged with the latching portion of the pushing assembly.

8. The wall hanging mechanism of claim 7, wherein the bottom cover further comprises a blocking plate and two guiding members; wherein the elastic member bears upon the blocking plate and the pushing plate is positioned between the two guiding members.

9. The wall hanging mechanism of claim 8, wherein the bottom cover further comprises a slot for receiving the protrusion portion.

10. The wall hanging mechanism of claim 6, wherein the top cover defines at least one mounting hole; the wall hanging mechanism further comprises at least one button for unlatching the sliding plate, wherein the elastic member pushes the sliding plate outwardly from the receiving space allowing the hanging plate to be rotatable.

11. The wall hanging mechanism of claim 1, wherein the bottom cover further comprises at least one clasp positioned on the bottom cover for securing the sliding plate in the receiving space.

\* \* \* \* \*